United States Patent Office 3,040,780
Patented June 26, 1962

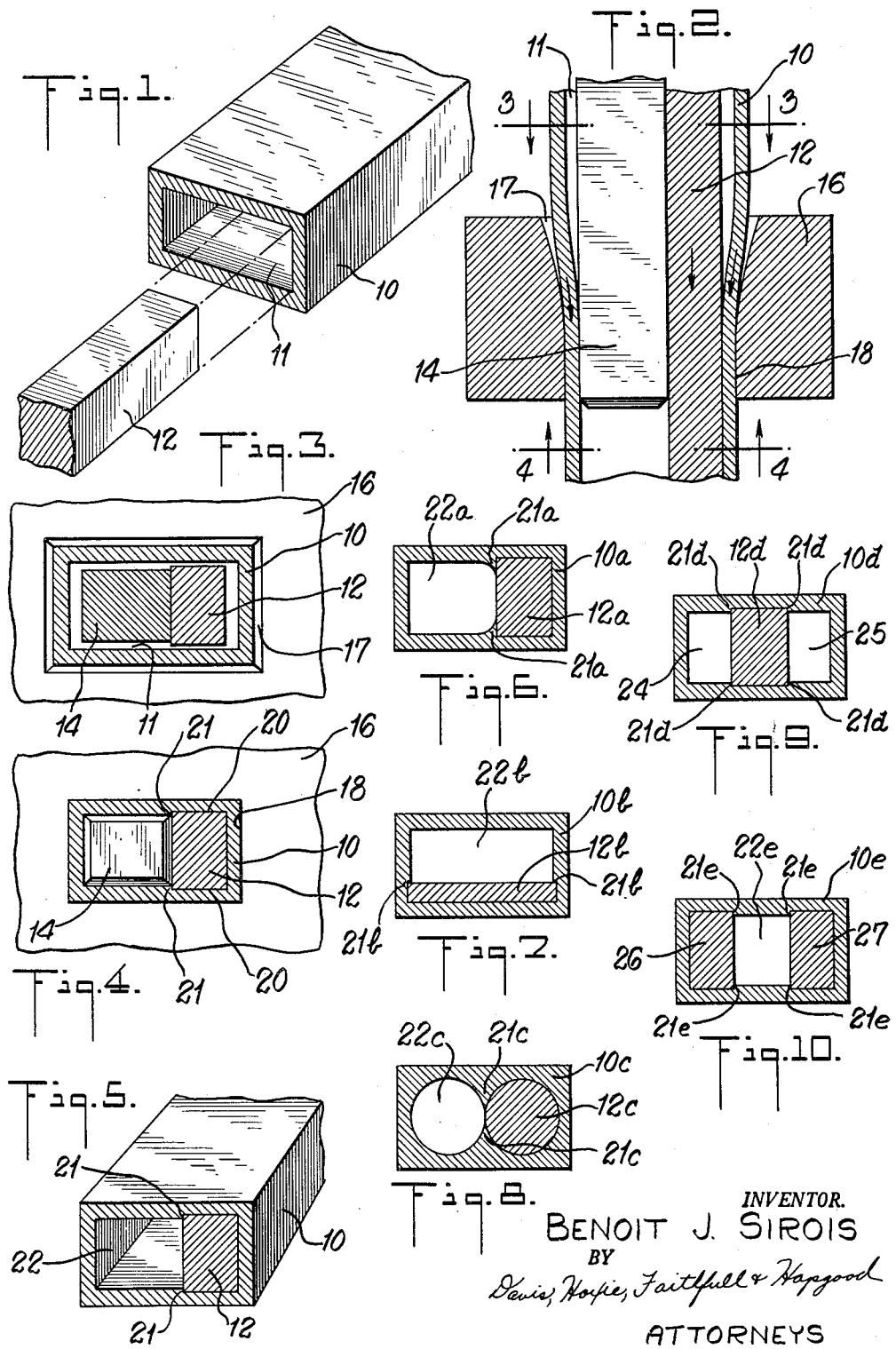

3,040,780
MULTI-COMPONENT METALLIC TUBE AND
METHOD OF MAKING SAME
Benoit J. Sirois, Roselle Park, N.J., assignor to Phelps
Dodge Copper Products Corporation, New York, N.Y.,
a corporation of Delaware
Filed Jan. 14, 1959, Ser. No. 786,876
9 Claims. (Cl. 138—142)

This invention relates to a metallic tube of the type having a longitudinal passage surrounded by a predetermined non-uniform distribution of the metal in the cross-section of the tube. The invention has particular reference to an improved multi-component tube of this type and to a method of making it.

Metallic tubes of the above-noted type are desired for various purposes, as for high-conductivity copper tubular conductors wound into electric furnace coils or transformer coils, the windings of which require internal cooling for satisfactory performance.

Tubes of this unbalanced wall type can be made (1) in one piece or (2) by inserting a separate component into an outer tubular component having a uniform distribution of metal in the cross-section and securing the two components together in an unsymmetrical relation by brazing. In the first case, it is not possible or practicable, so far as I am aware, to make the tube in the long lengths desired for many purposes. In the second case, the brazing of the components in the desired lengths is so costly that for many purposes this method is economically unfeasible.

The principal objects of the present invention are to provide a tube of the type described which overcomes the above-noted disadvantages, and to provide a simple method of making such a tube.

A tube made according to the present invention is a composite metallic tube comprising a hollow elongated metal shell having a substantially uniform distribution of metal in the cross-section of the shell, and an elongated metal insert in the shell extending lengthwise thereof and occupying only a predetermined part of the hollow interior of the shell. The part of the hollow interior of the shell unoccupied by the insert forms a longitudinal passage around which is the desired non-uniform distribution of metal in the cross-section of the composite tube. The shell has opposed interior surfaces compressed against opposite surfaces of the insert substantially continuouly along the length of the shell, whereby the insert is held securely in position in the shell even when the composite tube is bent, as in winding a coil.

In the composite tube of this invention, the longitudinal passage is partly defined by the metal insert. The insert is embedded in opposed walls of the shell so that the shell has interior longitudinal shoulders facing away from the passage and closely engaging the insert to lock it in position.

According to the method of the present invention, a hollow, elongated, metal shell is made, as by conventional tube fabrication. This shell has a substantially uniform distribution of metal in its cross-section, and its cross-section is substantially larger than that of the final composite tube of which the shell is to form the outer component. An elongated metallic member is inserted loosely into the shell endwise and along the length of the shell, leaving adjacent this inner member a longitudinal passage for loosely receiving a mandrel or plug which has a cross-section corresponding to that of the passage in the final composite tube. The mandrel is so formed in relation to the insert that when the two abut each other side-by-side in the shell, the insert has a surface overlapping the mandrel. The shell and insert member thus assembled are passed through a drawing zone where they are simultaneously compressed around the mandrel and drawn down to the desired cross-section of the final composite tube. Thus, the composite tube emerging from the mandrel in the drawing zone (which may be a die) has the desired cross-section in which there is a non-uniform distribution of metal around the passage left by the mandrel; and the latter serves the dual functions of determining the cross-section of this passage and locating the insert in the composite tube, the insert being locked in place by shoulders formed by displacement of metal as a result of the overlapping of the mandrel by the insert.

In certain applications, it may be desirable to provide between the insert and the outer shell a bond supplementing the mechanical bond obtained by the above-mentioned compressing or drawing operation. This additional bond can be effected by coating the insert with a brazing material before it is slid into its space in the hollow shell, and subjecting the assembly, after the drawing operation, to a temperature sufficiently high to fuse the brazing material.

For a better understanding of the invention, reference may be had to the accompanying drawings, in which:

FIG. 1 is a perspective view of one form of the elongated tubular shell and the insert, showing the parts aligned for sliding of the insert into the shell;

FIG. 2 is a longitudinal sectional view of the assembled shell and insert as they are passed through a drawing zone to compress the shell and insert against the mandrel;

FIGS. 3 and 4 are sectional views on the lines 3—3 and 4—4, respectively, in FIG. 2;

FIG. 5 is a cross-sectional view of the final composite tube from the drawing zone as shown in FIGS. 2–4, and FIGS. 6 through 10 are cross-sectional views of modified forms of the new composite metallic tube.

Referring to FIG. 1, the reference numeral 10 designates an elongated tubular metal shell having a longitudinal passage 11 which is adapted to receive loosely a metal insert 12. The two parts 10 and 12 may be made of any ductile metal or of two different metals, or one or both of them may be an alloy of different metals. The insert 12 may be made by rolling or drawing the metal into the required length, and the tubular shell 10 may be produced in the required length by conventional tube fabricating operations, it being noted that the shell 10 has a substantially uniform distribution of the metal around its hollow interior 11.

After fabrication of the parts 10 and 12, as described, the insert 12 is slid endwise into the passage 11 of the shell until the insert extends along the entire length of the shell. With the parts thus loosely assembled, the passage 11 provides space for loosely receiving a mandrel 14 adjacent the insert 12, the mandrel having a cross-section corresponding to that of the desired passage in the final composite tube. As indicated in FIG. 3, when the mandrel 14 abuts the adjacent insert 12, the surface of the insert facing the mandrel overlaps the abutting surface of the mandrel.

The mandrel or plug 14 is used in conjunction with a die 16 for subjecting the assembly 10—12 to a drawing operation in which opposed interior surfaces of the shell 10 are compressed against opposite surfaces of the insert 12 substantially continuously along the length of the shell, as shown in FIGS. 2 and 4. The die 16 has a passage which at its receiving end 17 is adapted to receive the shell 10 with a clearance, this passage tapering to a discharge end 18 having a cross-section which is substantially smaller than that of the shell 10 prior to the drawing operation and which corresponds to the desired cross-section of the final composite tube.

In the drawing operation, the loosely assembled parts 10—12 are fed to and through the die passage 17—18 as shown by the arrows in FIG. 2, the mandrel 14 being held against longitudinal displacement in the die passage in any conventional manner. For example, the mandrel 14 may be a so-called floating mandrel, or it may have a rod (not shown) extending through the shell in the direction opposite to the feeding direction and secured to a table (not shown). Thus, as the assembled parts 10—12 are moved through the die 16 or drawing zone, the tube 10 is drawn down to its final cross-section, whereby the mandrel 14 and insert 12 are pressed together and the shell 10 is compressed against and around the mandrel and insert, as shown in FIG. 4. As a result, opposed interior surfaces 20 of the shell are compressed against opposite surfaces of the insert 12; and due to the previously mentioned overlapping of the mandrel 14 by the insert, the shell is formed with internal shoulders 21 tightly engaging the insert 12 so as to lock it in its final position in the composite tube.

In the final composite tube, as shown in FIG. 5, the passage 22 left by the mandrel 14 is surrounded by the desired non-uniform distribution of metal in the cross-section of the composite tube, due to the presence of the insert 12 in the shell. The insert 12 is firmly embedded in opposed interior surfaces of the shell continuously along the length of the shell, the shoulders 21 serving to prevent displacement of the insert into the tube passage 22. Thus, the parts are held firmly together by the shoulders 21 and the mechanical bond between the other interengaging surfaces of the parts, so that subsequent coil winding operations on the composite tube will not cause detrimental relative movements between the outer and inner components 10 and 12.

The modifications illustrated in FIGS. 6, 7 and 8 differ from that shown in FIG. 5 principally in the cross-sectional configuration of the composite tube. In these modifications, the parts corresponding to those in FIG. 5 are given similar reference numerals but with the subscripts "a," "b" and "c," respectively. These modifications are made by the method previously described, it being understood that the mandrel used in each case has a cross-section corresponding to that of the passage 22a, 22b or 22c.

As shown in FIG. 9, the insert 12d is placed between the sides of the shell 10d, so that the shell interior is divided into two separate longitudinal passages 24 and 25. At each side, the insert 12d is engaged by upper and lower shoulders 21d which lock the insert against displacement into either of the passages 24—25. In this case, the drawing operation is effected with the use of two mandrels located in the die at opposite sides of the insert 12d, each mandrel having the same cross-section as the corresponding passage 24 or 25.

In the modification shown in FIG. 10, the shell 10e contains two inserts 26 and 27 forming opposite sides of the single passage 22e. Each insert is locked against the adjacent side of the shell 10e by upper and lower shoulders 21e of the shell. In this case, the drawing operation is effected with the use of a single mandrel located in the die between the two inserts 26—27.

While the composite tube as illustrated is of rectangular shape in cross-section, it may take any other desired shape, such as square, oval, round or even irregular, as required. The insert or inserts of the composite tube may be round, trapezoidal, square, rectangular or polygonal in cross-section. While the preferred insert is solid, a hollow or tubular insert may be used if desired.

I claim:

1. A composite metallic tube comprising a hollow elongated metal shell having a pair of opposed parallel interior surfaces and a substantially uniform distribution of metal in the cross-section of the shell, and an elongated metal insert in the shell extending lengthwise thereof and occupying only part of the hollow interior of the shell, the part of said hollow interior unoccupied by the insert forming a longitudinal passage around which is a non-uniform distribution of metal in the cross-section of the composite tube, the insert being of substantially harder metal than said shell and having opposite surfaces embedded in said parallel interior surfaces, respectively, of the shell substantially continuously along the length of the shell to hold the insert in position in the shell, said passage being partly defined by the insert, said shell having a continuous cross-section forming an endless enclosure for said insert and being the product of a drawing operation.

2. A composite metallic tube according to claim 1, in which the shell is compressed against all the surfaces of the insert which are contaained in the shell, except for a surface of the insert which partly defines said passage.

3. A composite metallic tube according to claim 1, in which the shell has interior longitudinal shoulders facing away from said passage and closely engaging the insert.

4. A composite metallic tube according to claim 1, in which the shell has opposed interior longitudinal shoulders facing away from said passage and closely engaging the insert, the insert having a surface extending between said shoulders and partly defining said passage.

5. A composite metallic tube according to claim 1, in which the insert is brazed to the shell.

6. A composite metallic tube according to claim 1, in which the insert is spaced from opposite sides of the shell and partly defines a longitudinal passage at each side of the insert, the shell having interior shoulders engaging each side of the insert at the top and bottom thereof.

7. A composite tube according to claim 1, comprising also a second insert in the shell, the passage being located between the two inserts, the second insert having opposite surfaces embedded in said opposed interior surfaces of the shell substantially continuously along the length of the shell to hold the second insert in position in the shell.

8. A method for making a composite metallic tube, which comprises forming a hollow, elongated, metallic shell with a substantially uniform distribution of metal in the cross-section of the shell, forming from a metal substantially harder than the shell an elongated inner metallic member adapted for insertion loosely into the shell, forming a loose assembly of the shell and inner member by sliding the inner member endwise into the shell and along the length of the shell, leaving a longitudinal passage in the shell adjacent the inner member, and passing the assembly endwise through a drawing zone and there drawing the shell down to a reduced cross-section while embedding the inner member into the shell by compressing the shell against and around the inner member and an adjacent mandrel held in said drawing zone, the mandrel being located in said passage and abutting an over-lapping surface of the inner member passing through said zone, whereby opposite surfaces of the inner member are embedded in opposed interior surfaces of the shell to form shoulders locking the inner member against displacement into the passage left by the mandrel in the assembly discharged from the drawing zone, the mandrel holding the iner member in position in the shell as the assembly passes through the drawing zone, whereby there is a non-uniform distribution of metal around said passage left by the mandrel.

9. A method according to claim 8, comprising also the steps of applying a coating of brazing material on the inner member before it is slid into the shell, and, after passing said assembly through the drawing zone, heating the assembly to a temperature sufficient to fuse the brazing material.

References Cited in the file of this patent

UNITED STATES PATENTS

| | | |
|---|---|---|
| 1,591,116 | Dunbar | July 6, 1926 |
| 2,040,088 | Jesevich | May 12, 1936 |
| 2,062,246 | Atkinson | Nov. 24, 1936 |
| 2,550,021 | Rappl | Apr. 24, 1951 |
| 2,677,765 | Collins et al. | May 4, 1954 |